US011373851B2

(12) United States Patent
Aoki et al.

(10) Patent No.: US 11,373,851 B2
(45) Date of Patent: Jun. 28, 2022

(54) HIGH-VOLTAGE POWER SUPPLY DEVICE

(71) Applicant: Shimadzu Corporation, Kyoto (JP)

(72) Inventors: Yasushi Aoki, Kyoto (JP); Takuro Kishida, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 378 days.

(21) Appl. No.: 16/640,544

(22) PCT Filed: Sep. 4, 2017

(86) PCT No.: PCT/JP2017/031773
§ 371 (c)(1),
(2) Date: Feb. 20, 2020

(87) PCT Pub. No.: WO2019/043943
PCT Pub. Date: Mar. 7, 2019

(65) Prior Publication Data
US 2020/0357623 A1    Nov. 12, 2020

(51) Int. Cl.
*H01J 49/40* (2006.01)
*G05F 1/56* (2006.01)
(Continued)

(52) U.S. Cl.
CPC .............. *H01J 49/40* (2013.01); *G05F 1/56* (2013.01); *H02J 7/0024* (2013.01);
(Continued)

(58) Field of Classification Search
CPC . H01J 49/40; H01J 49/022; G05F 1/56; H02J 7/0024; H02J 7/0063; H02J 7/345; H02J 2207/20; H02M 3/156; H02M 3/07
(Continued)

(56) References Cited

U.S. PATENT DOCUMENTS 6,762,561 B1 *  7/2004  Kawato ............... H01J 49/022
                                                  331/165
10,984,997 B2 *  4/2021  Aoki .................... H02J 1/084
(Continued)

FOREIGN PATENT DOCUMENTS

CN      1728214 A     2/2006
EP      1624434 A2    2/2006
(Continued)

OTHER PUBLICATIONS

U.S. Office Action dated Nov. 25, 2020 issued in related U.S. Appl. No. 16/339,194.
(Continued)

*Primary Examiner* — Ryan Jager
(74) *Attorney, Agent, or Firm* — Norton Rose Fulbright US LLP

(57) ABSTRACT

A negative DC voltage is supplied to a flight tube from a negative voltage generator by turning on switching elements and turning off other switching elements during performance of a measurement, and a capacitor is charged by an auxiliary positive voltage generator by turning on a switching element. When an applied voltage is switched from a negative to a positive polarity, a large current is supplied to the flight tube from the capacitor by turning off the switching elements and turning on the switching element, and thus a capacitance is quickly charged to a positive potential. Thereafter, a stable positive DC voltage is applied to the flight tube from a positive voltage generator by turning off the switching element and turning on the switching element.

7 Claims, 6 Drawing Sheets

(51) Int. Cl.
*H02J 7/00* (2006.01)
*H02J 7/34* (2006.01)
*H02M 3/156* (2006.01)

(52) U.S. Cl.
CPC ............ *H02J 7/0063* (2013.01); *H02J 7/345* (2013.01); *H02M 3/156* (2013.01)

(58) Field of Classification Search
USPC .......................................................... 250/287
See application file for complete search history.

(56) References Cited

U.S. PATENT DOCUMENTS

| | | | |
|---|---|---|---|
| 11,191,269 B2* | 12/2021 | Breuniger | A01N 43/54 |
| 2003/0214269 A1 | 11/2003 | Shiue et al. | |
| 2004/0112320 A1* | 6/2004 | Bolz | H02J 7/1423 |
| | | | 290/31 |
| 2004/0112326 A1 | 6/2004 | Bolz et al. | |
| 2004/0132083 A1 | 7/2004 | Kawato et al. | |
| 2006/0022904 A1 | 2/2006 | Kwak et al. | |
| 2011/0101218 A1 | 5/2011 | Makarov et al. | |
| 2016/0138550 A1 | 5/2016 | Kirlew et al. | |
| 2017/0302094 A1 | 10/2017 | Lynds | |
| 2019/0311893 A1* | 10/2019 | Aoki | H02J 7/345 |

FOREIGN PATENT DOCUMENTS

| | | |
|---|---|---|
| JP | 2004-214077 A | 7/2004 |
| JP | 2006-039576 A | 2/2006 |
| JP | 2006-080031 A | 3/2006 |
| JP | 2010-249981 A | 11/2010 |
| KR | 10-2006-0011216 A | 2/2006 |
| KR | 10-2006-0023084 A | 3/2006 |
| WO | 2009/144469 A1 | 12/2009 |

OTHER PUBLICATIONS

U.S. Office Action (1st) dated Apr. 9, 2020 issued in related U.S. Appl. No. 16/339,194.
Extended European Search Report dated Apr. 20, 2020 issued in related EP patent application 16918264.9.
English translation of International Search Report dated Nov. 28, 2017 issued in corresponding PCT Application PCT/JP2017/031773.
Written Opinion of the International Search Authority (ISA237) dated Nov. 28, 2017 with its machine translation issued for PCT/JP2017/031773.
Written Opinion of the International Search Authority (ISA237) dated Dec. 13, 2016 with its machine translation issued for PCT/JP2016/079491.
Japanese Office Action dated Nov. 12, 2019 issued in related JP Application 2018-543511.

* cited by examiner

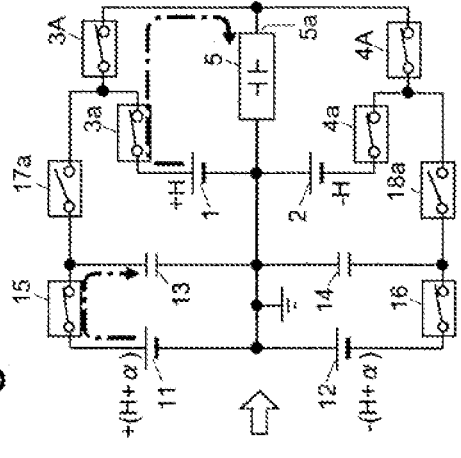
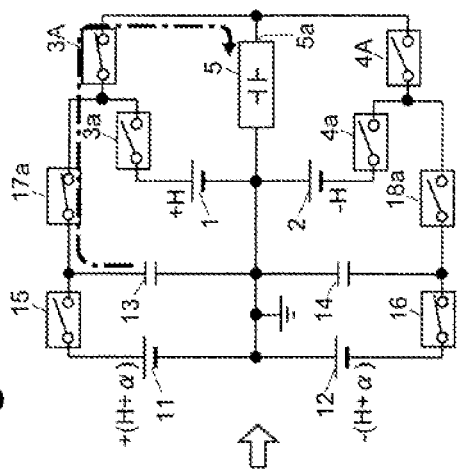
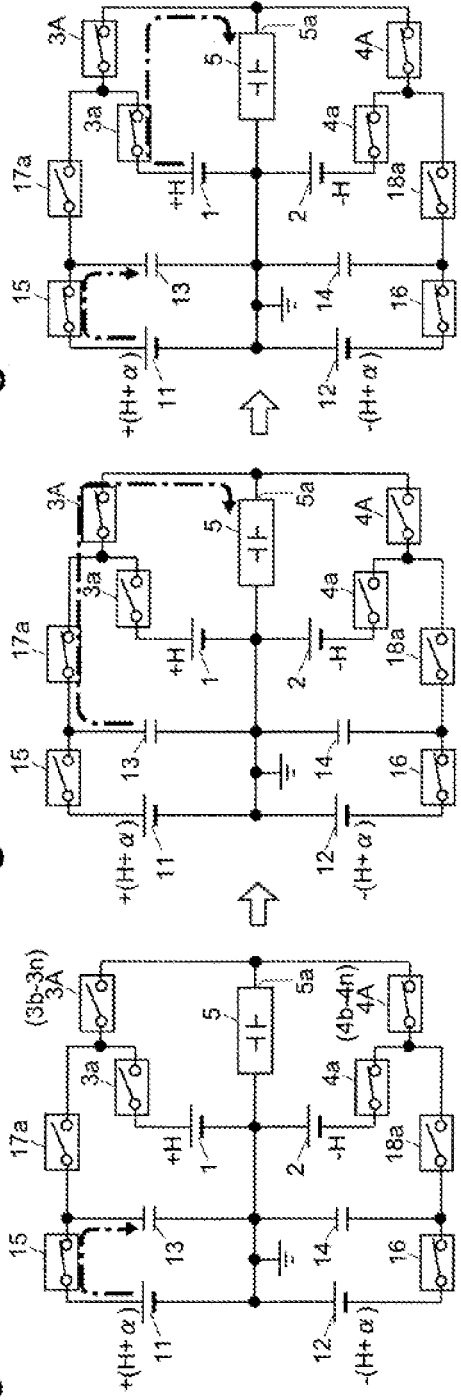
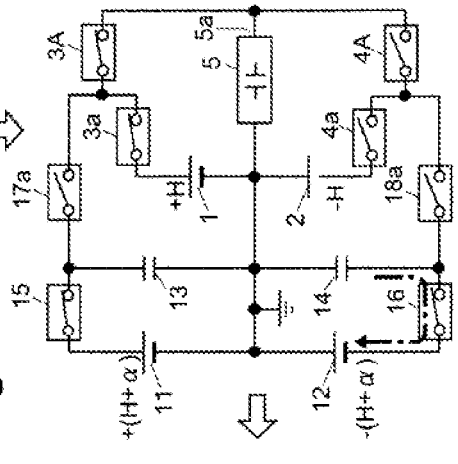
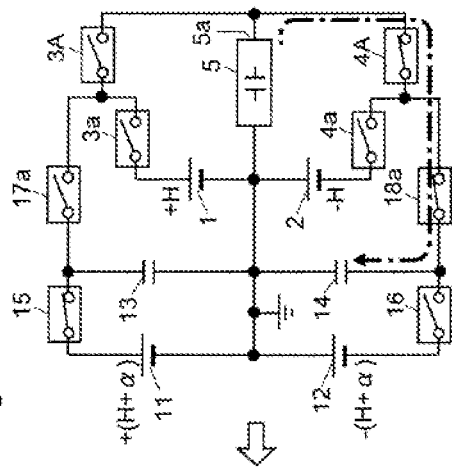
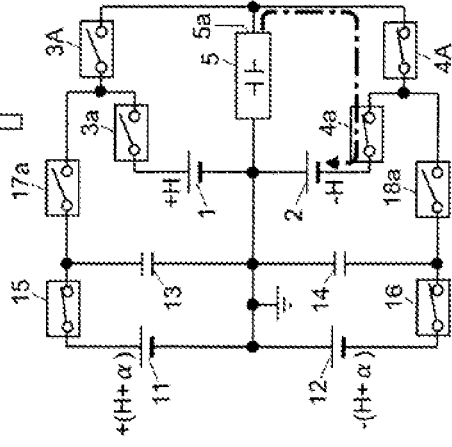

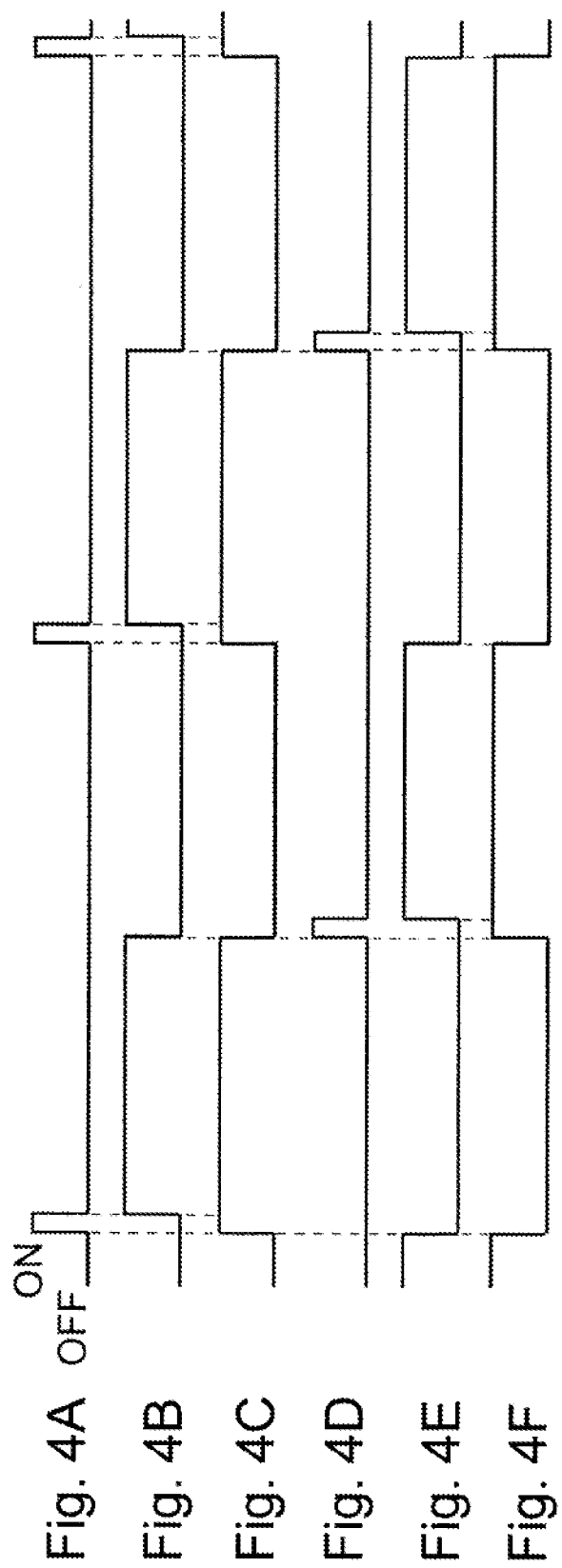

Prior Art

HIGH-VOLTAGE POWER SUPPLY DEVICE

CROSS-REFERENCE TO RELATED APPLICATIONS

The present application is the national stage of International Pat. App. No. PCT/JP2017/031773 filed Sep. 4, 2017, the content of which is incorporated herein by reference in its entirety.

FIELD OF THE INVENTION

The present invention relates to a mass spectrometer with a high-voltage power supply device, and more particularly, to mass spectrometer with a high-voltage power supply device appropriate to apply a DC high voltage to a capacitive load having a relatively large capacitance such as a flight tube of a time-of-flight mass spectrometer.

BACKGROUND

In a time-of-flight mass spectrometer (hereinafter, idiomatically referred to as "TOFMS"), various ions derived from a sample are ejected from an ion ejection unit, and a flight time for the ions to fly in a flight space formed in a flight tube is measured. Since a flying ion has a velocity corresponding to the mass-to-charge ratio m/z, the flight time corresponds to the mass-to-charge ratio of the ion, and thus, it is possible to calculate the mass-to-charge ratio from the flight time of the ion.

For example, as disclosed in Patent Literature 1, a DC high voltage of about several kV to several tens of kV having a polarity depending on the polarity of an ion to be analyzed is applied to the flight tube in the TOFMS from a high-voltage power supply device capable of switching and outputting DC high voltages having both positive and negative polarities. When the potential of the flight tube changes during analysis, the flight distance of the ion changes, and thus, mass accuracy and mass resolution can deteriorate. In a reflectron type TOFMS, the potential of the flight tube is sometimes set as the reference potential of the reflectron for forming a reflection electric field that reflects ions. In such a case, a change in potential of the flight tube during analysis greatly influences the mass accuracy.

Thus, the high-voltage power supply device needs to output a high DC voltage of about several kV to several tens of kV while maintaining high stability with a voltage fluctuation of about several ppm or less. In the TOFMS capable of alternately and repeatedly performing positive-ion measurement and negative-ion measurement, since it is necessary to switch the polarity of the output voltage of the high-voltage power supply device in a short cycle, the high-voltage power supply device needs to shorten a time until the voltage is stabilized as much as possible at the time of switching the polarity of the output voltage.

FIGS. 6A to 6D are explanatory diagrams of a schematic configuration and an operation of a high-voltage power supply device for a general flight tube of the related art.

As illustrated in FIG. 6A, this high-voltage power supply device includes a positive voltage generator 1 that outputs a positive DC high voltage having a voltage value of H [V], a negative voltage generator 2 that outputs a negative DC high voltage having a voltage value of –H [V], a positive-side main switch circuit 3 that is provided on a line which electrically connects the positive voltage generator 1 and a flight tube 5 as a load to each other, and a negative-side main switch circuit 4 that is provided on a line which electrically connects the negative voltage generator 2 and the flight tube 5 to each other. In general, the main switch circuits 3 and 4 respectively include one or a plurality of MOSFETs as semiconductor switching elements. A booster circuit in which voltage doubler rectifier circuits are connected in multiple stages such as a Cockcroft-Walton circuit is used as the positive voltage generator 1 and the negative voltage generator 2 in many cases. The voltage value ±H of the DC high voltage is generally about ±5 to ±10 [kV]. The flight tube 5 is a substantially cylindrical tube which is made of metal and has a length of about 1 to 2 [m], and is a capacitive load having a capacitance of Ca [F].

In the TOFMS, when the positive high voltage and the negative high voltage applied to the flight tube 5 are alternately switched in order to alternately conduct the positive-ion measurement and the negative-ion measurement, the positive-side main switch circuit 3 and the negative-side main switch circuit 4 are alternately turned on and off. However, in order for both the main switch circuits 3 and 4 not to be simultaneously turned on, the main switch circuits 3 and 4 are generally controlled such that after one switch circuit (for example, the positive-side main switch circuit 3) is switched from a turned-on state to a turned-off state, the other switch circuit (for example, the negative-side main switch circuit 4) is switched from a turned-off state to a turned-on state.

When the positive-side main switch circuit 3 is turned on from a state in which both the main switch circuits 3 and 4 are turned off, a current i1 flows from the positive voltage generator 1 to the flight tube 5 through the positive-side main switch circuit 3, and the capacitance of the flight tube 5 is charged (as illustrated in FIG. 6A). When the capacitance is completely charged, the potential at a voltage application end 5a of the flight tube 5 is stabilized at +H [V], and a measurement is performed in this state (as illustrated in FIG. 6B). When the measurement is completed, in order to switch the switch circuits such that a negative high voltage is applied to the flight tube 5, the positive-side main switch circuit 3 is first turned off, and the negative-side main switch circuit 4 is subsequently turned on. By doing this, a current i2 due to electric charges previously stored in the capacitance of the flight tube 5 flows from the flight tube 5 to the negative voltage generator 2 through the negative-side main switch circuit 4. Then, the capacitance is charged to an opposite polarity (as illustrated in FIG. 6C). When the capacitance is completely charged to the opposite polarity, the potential at the voltage application end 5a of the flight tube 5 is stabilized at –H [V], and a measurement is performed in this state (as illustrated in FIG. 6D).

The capacitance of the flight tube 5 is usually about several hundred pF to several nF, depending on its size. A stabilization time is from when the main switch circuits 3 and 4 are switched to the turned-on state to when the potential at the voltage application end 5a of the flight tube 5 gradually rises in the positive or negative direction and the potential stabilizes depends on current supply capability of the voltage generators 1 and 2 and responsiveness to load fluctuation. When the current supply capability is increased (that is, when the currents i1 and i2 are increased), the stabilization time ts is shortened. However, as the current supply capability is increased, the cost of the voltage generators 1 and 2 increases. When the responsiveness to the load fluctuation is increased in the voltage generators 1 and 2, the stabilization time ts is shortened, but the stability of the DC voltage tends to deteriorate. Due to such restrictions, there is a limit in increasing the current supply capability of the voltage generators 1 and 2 and the responsiveness to load fluctuation. Thus, when the capacitance of the flight tube 5 is about several nF, the stabilization time ts in the high-voltage power supply device of the related art is about several hundred ms. The length of this time is a major restriction in shortening the time needed for switching the polarity of the voltage applied to the flight tube 5, that is, shortening a measurement cycle when the positive-ion measurement and the negative-ion measurement are alternately performed.

Such a problem also arises not only at the time of switching between the positive and negative polarities of the output voltage, but also when the application of the voltage is started from a state in which the application of the voltage is stopped, that is, when the applied voltage is raised from zero to +H [V] or −H [V].

The same problem arises not only in the high-voltage power supply device that applies the high voltage to the flight tube 5, but also in a high-voltage power supply device that applies a stable DC high voltage to a load having a relatively large capacitance (capacitive load).

CITATION LIST

Patent Literature

Patent Literature 1: JP 2006-80031 A

SUMMARY OF THE INVENTION

Technical Problem

The present invention has been made to solve the above-described problems, and an object of the present invention is to reduce time, in a mass spectrometer with a high-voltage power supply device that applies a stable high voltage to a capacitive load, for a voltage rise when the application of the voltage is started from a state in which the voltage is stopped or a polarity of the applied voltage is switched while suppressing an increase in device cost.

Solution to Problem

The present invention made to solve the above-described problems is a mass spectrometer with a high-voltage power supply device configured to apply a DC high voltage to a load. The device includes
  a) a main voltage generator configured to generate a predetermined DC high voltage;
  b) a main switch unit configured to open and close a line which connects a voltage output end of the main voltage generator and the load to each other, and includes a plurality of switching elements connected in series;
  c) an auxiliary power supply unit configured to be capable of supplying a current larger than a current capable of being supplied by the main voltage generator to the load;
  d) an auxiliary switch unit configured to open and close a line which connects a voltage output end of the auxiliary power supply unit and the load to each other, the auxiliary switch unit including a predetermined number of switching elements from a side of the load among the plurality of switching elements in the main switch unit, and another one or a plurality of switching elements connected in series between the predetermined number of switching elements and the voltage output end of the auxiliary power supply unit; and
  e) a control unit configured to drive the switching elements of the main switch unit and the auxiliary switch unit such that a current is supplied to the load from the auxiliary power supply unit to charge a capacitance of the load by closing the auxiliary switch unit before the main switch unit is closed or immediately after the main switch unit is closed when the DC high voltage from the main voltage generator starts to be applied to the load by closing the main switch unit from an opened state.

In the high-voltage power supply device according to the present invention, when the control unit closes the main switch unit which is in the opened state, the main voltage generator and the load are connected via the main switch unit, and the DC high voltage from the main voltage generator is applied to the load. At this time, the control unit closes the auxiliary switch unit for a short time immediately before the main switch unit is closed or immediately after the main switch unit is closed. Accordingly, the auxiliary power supply unit supplies the current larger than the current capable of being supplied by the main voltage generator to the load for a short time. When the DC high voltage applied to the load is positive, the auxiliary power supply unit supplies a positive current to the load (that is, a current flows into the load), and when the DC high voltage applied to the load is negative, the auxiliary power supply unit supplies a negative current to the load (that is, a current is drawn from the load). Since the capacitance of the load is quickly charged by the current supplied from the auxiliary power supply unit, the charge of the capacitance performed by supplying the current from the main voltage generator to the load is unnecessary or reduced, and thus, the potential of the load is settled to a desired value in a short time after the main switch unit is closed.

When the load to which the voltage is applied by the high-voltage power supply device according to the present invention is, for example, the above-described TOFMS flight tube, the voltage is 10 kV or more at the maximum. In this case, the voltage of 10 kV or more is applied to both ends of the main switch unit provided between the voltage output end of the main voltage generator and the load, and both ends of the auxiliary switch unit provided between the voltage output end of the auxiliary power supply unit and the load. However, since both the main switch unit and the auxiliary switch unit include the plurality of switching elements connected in series, the voltage applied to both ends of each switching element is a voltage divided according to the number of elements. Thus, the withstand voltage of one switching element can be smaller as the number of switching elements connected in series increases. However, when the number of switching elements increases, the cost increases, and thus, the area of a circuit board on which the elements are arranged also increases.

Meanwhile, in the high-voltage power supply device according to the present invention, a predetermined number (N−1 pieces at the maximum) of switching elements from the side of the load among the N pieces of switching elements in the main switch unit and a predetermined number of switching elements from the side of the load among M pieces of switching elements in the auxiliary switch unit are commonly used. Therefore, when the number of switching elements commonly used by the main switch unit and the auxiliary switch unit is N−1 (of course, M>N−1 in this case), the total number of switching elements required for the main switch unit and the auxiliary switch unit is N+M−(N−1). That is, when the switching elements are not commonly used, the total number of switching elements is N+M, whereas the number can be reduced.

In the high-voltage power supply device according to the present invention, even though the number of switching elements connected in series is increased to some extent, switching elements having a considerably high withstand voltage are required. Therefore, a power MOSFET can be used as the switching element.

In the high-voltage power supply device according to the present invention, the main switch unit and the auxiliary switch unit include the plurality of switching elements and the common switching element connected in series. Thus, the "closed state" of the switch unit means that all the switching elements included in the switch unit are closed (turned on), and the "opened state" of the switch unit means that at least one switching element included in the switch unit is opened (turned off). Therefore, when one of the main switch unit or the auxiliary switch unit is in the closed state, all the switching elements commonly used by the main switch unit and the auxiliary switch unit are in the closed state.

When a stable high DC voltage with little fluctuation is to be applied to the load, the current supply capability of the main voltage generator is restricted due to cost factors as described above. In contrast, since the auxiliary power supply unit is mainly used to charge the capacitance of the load when the applied voltage rises, the large current can be supplied for a short time.

Therefore, in the high-voltage power supply device according to the present invention, the auxiliary power supply unit can include a capacitor, and a charging power supply unit configured to charge the capacitor.

In this configuration, the capacitor is charged in advance by the charging power supply unit before the DC high voltage from the main voltage generator starts to be applied to the load by switching the main switch unit from the opened state to the closed state. For example, when the main switch unit is switched from the opened state to the closed state, the current due to the electric charges stored in the capacitor is supplied to the load through the auxiliary switch unit by closing the auxiliary switch unit for a short time just before the switching, and thus, the capacitance of the load is charged. After the capacitor and the load are disconnected by opening the auxiliary switch unit again, the main switch unit is closed, and the DC high voltage from the main voltage generator is applied to the load. The electric charges stored in the capacitor is discharged by closing the auxiliary switch unit, and thus, it is possible to temporarily supply the large current to the load. Accordingly, the potential of the load is raised in a short time, and thus, it is possible to quickly stabilize the potential of the load at the DC high voltage from the main voltage generator after the main voltage generator is connected to the load.

In a first aspect of the aforementioned configuration, the auxiliary power supply unit can further include a second auxiliary switch unit configured to open and close a line which connects the charging power supply unit and the capacitor, and the control unit closes the second auxiliary switch unit for a period during which the auxiliary switch unit is opened, and opens the second auxiliary switch unit when the auxiliary switch unit is closed.

In the first aspect, when the auxiliary switch unit is closed, the charging power supply unit and the capacitor are disconnected by opening the second auxiliary switch unit, and thus, it is possible to supply the large current due to the electric charges stored in the capacitor until just before the disconnection to the load.

In a second aspect of the aforementioned configuration, the auxiliary power supply unit can be provided at a line which connects the charging power supply unit and the capacitor to each other, and can include a resistor that restricts a current flowing through the auxiliary switch unit from the charging power supply unit when the auxiliary switch unit is closed.

In the second aspect, the second auxiliary switch unit in the first aspect is replaced with the resistor. In this configuration, when the auxiliary switch unit is closed, the capacitor and the charging power supply unit are connected through the resistor. However, when the resistance value of the resistor increases to some extent, the current flowing from the charging power supply unit to the load through the resistor is negligible. Accordingly, when the auxiliary switch unit is closed, it is possible to supply the large current due to the electric charges stored in the capacitor to the load.

The high-voltage power supply device according to the present invention can be a unipolar power supply device that applies a positive DC voltage of any one of positive and negative polarities to a load, but the present invention can also be applied to a polarity switching type power supply device capable of selectively applying a positive DC high voltage and a negative DC high voltage to a load.

That is, in the high-voltage power supply device according to the present invention, the main voltage generator can include a positive-side main voltage generator configured to generate a positive DC high voltage, and a negative-side main voltage generator configured to generate a negative DC high voltage, the main switch unit can include a positive-side main switch unit configured to open and close a line which connects a voltage output end of the positive-side main voltage generator and the load to each other, and a negative-side main switch unit configured to open and close a line which connects a voltage output end of the negative-side main voltage generator and the load to each other, the auxiliary power supply unit can include a positive-side auxiliary power supply unit capable of supplying a current larger than a current capable of being supplied by the positive-side main voltage generator to the load, and a negative-side auxiliary power supply unit capable of supplying a current larger than a current capable of being supplied by the negative-side main voltage generator to the load, and the control unit can drive switching elements of the positive-side main switch unit, the negative-side main switch unit, the positive-side auxiliary switch unit, and the positive-side auxiliary switch unit such that a current is supplied to the load from the positive-side auxiliary power supply unit to charge the capacitance of the load by closing the positive-side auxiliary switch unit before the positive-side main switch unit is closed or immediately after the positive-side main switch unit is closed when the DC high voltage from the positive-side main voltage generator starts to be applied to the load by closing the positive-side main switch unit from an opened state, and a current is supplied to the load from the negative-side auxiliary power supply unit to charge the capacitance of the load by closing the negative-side auxiliary switch unit before the negative-side main switch unit is closed or immediately after the negative-side main switch unit is closed when the DC high voltage from the negative-side main voltage generator starts to be applied to the load by closing the negative-side main switch unit from an opened state.

According to this configuration, not only when the positive or negative voltage starts to be applied from a state in which the voltage is not applied to the load, but also when the DC high voltage applied to the load is switched from the positive polarity to the negative polarity or vice versa, it is possible to quickly charge the capacitance of the load to a polarity opposite to the polarity immediately before being switched. Accordingly, it is possible to quickly stabilize the voltage after the polarity is switched.

For example, in the TOFMS, it is necessary to perform the measurement after the potential of the flight tube in which the polarity of the positive or negative voltage is switched according to a polarity of an ion to be analyzed is sufficiently stabilized. However, since the potential of the flight tube is quickly switched by using the high-voltage power supply device according to the present invention as a power supply device, it is possible to shorten a measurement cycle with which positive-ion measurement and negative-ion measurement are alternately performed.

Advantageous Effects of Invention

In the mass spectrometer with the high-voltage power supply device according to the present invention, when the application of the voltage to the load is started from a state in which the application of the voltage is stopped or when the polarity of the applied voltage is switched, the capacitance of the load is quickly charged by an auxiliary power supply unit provided besides the main voltage generator having high output voltage stability. Thus, even though the output current of the main voltage generator is restricted, it is possible to quickly settle the potential of the load to a desired stable value. Accordingly, since it is possible to suppress the output current of the main voltage generator requiring high voltage stability, it is possible to suppress an increase in device cost. Since it is not necessary to increase responsiveness to load fluctuation more than necessary, it is possible to apply a stable DC high voltage to the load.

In the mass spectrometer with the high-voltage power supply device according to the present invention, it is possible to reduce the number of switching elements to be used in the switch units compared to a case where the switching elements are not commonly used by the main switch unit and the auxiliary switch unit. Accordingly, it is possible to reduce the cost of the main switch unit and the auxiliary switch unit, and it is possible to decrease an area of a circuit board on which these elements are arranged. Therefore, there is an advantage in reducing the size and weight of the device.

BRIEF DESCRIPTION OF THE DRAWINGS

FIGS. 2A to 2F are operation explanatory diagrams at the time of switching a polarity of an output voltage in the high-voltage power supply device of the first example embodiment.

FIGS. 4A to 4F show timing charts of control signals at the time of switching a polarity of an output voltage in the high-voltage power supply device of the second example embodiment.

DETAILED DESCRIPTION

Figure 1:
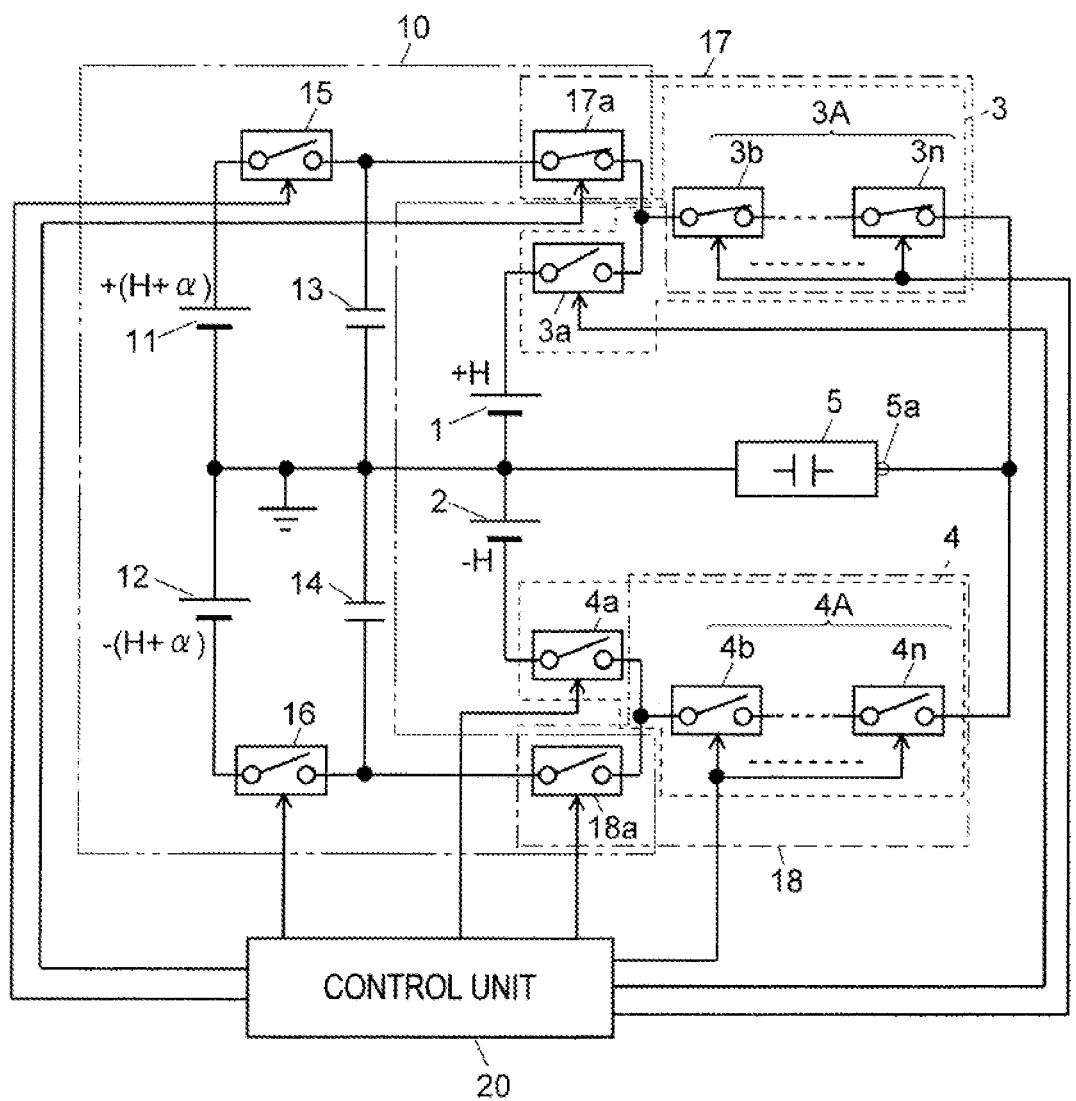
FIG. 1 is a schematic configuration diagram of a high-voltage power supply device according to a first example embodiment of the present invention.

Hereinafter, a first example embodiment of a high-voltage power supply device according to the present invention will be described with reference to the accompanying drawings. FIG. 1 is a schematic configuration diagram of the high-voltage power supply device according to the first example embodiment, and FIGS. 2A to 2F are operation explanatory diagrams at the time of switching a polarity of an output voltage in the high-voltage power supply device of the first example embodiment. In FIG. 1, the same or corresponding components as those of a high-voltage power supply device of the related art illustrated in FIGS. 6A to 6D will be assigned the same reference signs.

In the high-voltage power supply device of the present example embodiment illustrated in FIG. 1, a positive voltage generator 1 and a negative voltage generator 2 (corresponding to main voltage generators in the present invention), and a flight tube 5 as a load are the same as those in the high-voltage power supply device of the related art illustrated in FIGS. 6A to 6D. A positive-side main switch circuit 3 and a negative-side main switch circuit 4 (corresponding to main switch units in the present invention) in the high-voltage power supply device of the related art are replaced with a plurality of switching elements 3a, 3b, . . . , and 3n connected in series and a plurality of switching elements 4a, 4b, . . . , and 4n connected in series in FIG. 1. The switching element is generally a power MOSFET, but is not limited thereto. The reason why the switching elements are connected in series is to reduce a voltage applied to both ends of one switching element. The number of switching elements connected in series can be appropriately determined depending on a withstand voltage and a voltage applied to the flight tube 5. For the sake of convenience in description, the plurality of switching elements 3b, . . . , and 3n is denoted by a reference numeral 3A, and the plurality of switching elements 4b, . . . , and 4n is denoted by a reference sign 4A.

The high-voltage power supply device of the present example embodiment includes an auxiliary power supply unit 10 (corresponding to an auxiliary power supply unit in the present invention) in addition to the above-described components. The auxiliary power supply unit 10 includes an auxiliary positive voltage generator 11 that outputs a positive DC high voltage having a voltage value of $+(H+\alpha)$ [V], an auxiliary negative voltage generator 12 that outputs a negative DC high voltage having a voltage value of $-(H+\alpha)$ [V], a first capacitor 13 of which one end is grounded, a second capacitor 14 of which one end is also grounded, a positive-side second auxiliary switch circuit 15 that is provided at a line which electrically connects the auxiliary positive voltage generator 11 and the other end of the first capacitor 13 to each other, and a negative-side second auxiliary switch circuit 16 that is provided at a line which electrically connects the auxiliary negative voltage generator 12 and the other end of the second capacitor 14. The auxiliary power supply unit 10 includes a positive-side charge and discharge auxiliary switching element 17a constituting a positive-side first auxiliary switch circuit 17 by cooperating with the plurality of switching elements 3b, . . . , and 3n (3A) included in the positive-side main switch circuit 3, and a negative-side charge and discharge auxiliary switching element 18a constituting a negative-side first auxiliary switch circuit 18 by cooperating with the plurality of switching elements 4b, . . . , and 4n (4A) included in the negative-side main switch circuit 4. The positive-side charge and discharge auxiliary switching element 17a and the negative-side charge and discharge auxiliary switching element 18a correspond to auxiliary switch units in the present invention.

That is, the plurality of switching elements 3A connected in series is shared by the positive-side main switch circuit 3 and the positive-side first auxiliary switch circuit 17. The positive-side main switching element 3a is included only in the positive-side main switch circuit 3, and the positive-side charge and discharge auxiliary switching element 17a is included only in the positive-side first auxiliary switch circuit 17. Similarly, on a negative polarity side, the plurality of switching elements 4A connected in series is shared by the negative-side main switch circuit 4 and the negative-side first auxiliary switch circuit 18. The switching element 4a is included only in the negative-side main switch circuit 4, and the negative-side charge and discharge auxiliary switching element 18a is included only in the negative-side first auxiliary switch circuit 18.

Each of the switching elements 3a, 17a, 4a, and 18a can be obtained by connecting a plurality of power MOSFETs in series instead of one power MOSFET. The positive-side second auxiliary switch circuit 15 and the negative-side second auxiliary switch circuit 16 in the auxiliary power supply unit 10 can also be obtained by connecting a plurality of power MOSFETs in series.

The control unit 20 controls turned-on (closing) and turned-off (opening) operations of the positive-side main switching element 3a, the switching elements 3A connected in series, and the positive-side charge and discharge auxiliary switching element 17a which constitute the positive-side main switching circuit 3, and the switching element 4a, the switching elements 4A connected in series, and the negative-side charge and discharge auxiliary switching element 18a which constitute the negative-side main switching circuit 4, the positive-side second auxiliary switch circuit 15, and the negative-side second auxiliary switch circuit 16, and is mainly a microcomputer which typically includes a microprocessor, a ROM, and a RAM.

The voltage value of (H+α) [V] of the DC high voltage which is the output of the auxiliary positive voltage generator 11 is higher than the voltage value H [V] of the DC high voltage which is the output of the positive voltage generator 1 by α [V]. Similarly, the voltage value of the DC high voltage which is the output of the auxiliary negative voltage generator 12 −(H+α) [V] has an absolute value higher than the voltage value of the DC high voltage which is the output of the negative voltage generator 2 −H [V] by α [V]. As will be described below, α [V] is appropriately determined according to the capacitances of the first and second capacitors 13 and 14 and a capacitance value Ca of the capacitance of the flight tube 5.

An operation at the time of switching the polarity of the voltage applied to the flight tube 5 in this high-voltage power supply device will be described with reference to FIGS. 2A to 2F. Now, it is assumed that a voltage at a voltage application end 5a of the flight tube 5 is stable at −H [V] in a state in which the negative-side main switching circuit 4 (all the negative-side main switching element 4a and the switching elements 4A connected in series) is turned on, the positive-side main switching circuit 3 (all the positive-side main switching element 3a and the switching elements 3A connected in series) is turned off, and both the charge and discharge auxiliary switching elements 17a and 18a are turned off. At this time, the positive-side second auxiliary switch circuit 15 is turned on, and the first capacitor 13 is charged by the output voltage of +(H+α) [V] of the auxiliary positive voltage generator 11 (as illustrated in FIG. 2A). When the capacitor is fully charged, an end-to-end voltage of the first capacitor 13 becomes +(H+α) [V].

When the voltage applied to the flight tube 5 is changed from a negative polarity to a positive polarity, initially, the negative-side main switch circuit 4 (all the negative-side main switching element 4a and the switching elements 4A connected in series) and the positive-side second auxiliary switch circuit 15 are turned off, and the positive-side charge and discharge auxiliary switching element 17a and the switching elements 3A connected in series (that is, the positive-side first auxiliary switch circuit 17) are turned on. By doing this, the first capacitor 13 and the flight tube 5 are connected via the positive-side charge and discharge auxiliary switching element 17a and the switching elements 3A connected in series, and a current due to the electric charge stored in the first capacitor 13 flows to the flight tube 5 (as illustrated in FIG. 2B). The capacitance of the flight tube 5 is charged such that the voltage application end 5a has a negative polarity until just before being charged, but is rapidly charged to a positive polarity by the flow of the current.

At this time, a voltage of H' [V] of the voltage application end 5a, a capacitance Cb [F] of the first capacitor 13, a capacitance value Ca [F] of the capacitance of the flight tube 5, and α [V] have the following relationship.

$$\alpha = (Ca/Cb) \cdot (H-H')[V]$$

When the voltage at the voltage application end 5a is H'=−H, the aforementioned expression becomes the following expression.

$$\alpha = 2 \cdot (Ca/Cb) \cdot H[V]$$

Therefore, when Ca and Cb are known, α [V] for setting H' [V] to be equal to H [V] is obtained from the aforementioned equation. For example, when Ca=1 [nF], Cb=7 [nF], and H [V]=±7 [kV], α=(2/7)×7=2 [kV]. That is, the output voltage of the auxiliary positive voltage generator 11 can be 9 [kV].

After the capacitance of the flight tube 5 is charged by the current supplied from the first capacitor 13, the positive-side charge and discharge auxiliary switching element 17a is turned off while the switching elements 3A connected in series are turned on, and the positive-side main switching element 3a and the positive-side second auxiliary switch circuit 15 are turned on. Accordingly, since the positive voltage generator 1 is connected to the flight tube 5, the stable DC voltage of which the voltage value is H [V] is applied to the flight tube 5 (as illustrated in FIG. 2C). Meanwhile, the charging voltage of the first capacitor 13 is lowered by the discharge of the first capacitor 13, but the first capacitor 13 and the auxiliary positive voltage generator 11 are connected again by turning on the positive-side second auxiliary switch circuit 15, and the first capacitor 13 is charged until the end-to-end voltage thereof becomes +(H+α) [V]. Measurement is performed in a state in which the stable DC voltage is applied from the positive voltage generator 1 to the flight tube 5 (as illustrated in FIG. 2D). When the measurement is performed, since the negative-side second auxiliary switch circuit 16 is turned on, the second capacitor 14 is charged by the output voltage of $-(H+\alpha)$ [V] of the auxiliary negative voltage generator 12, and an end-to-end voltage of the second capacitor 14 is $-(H+\alpha)$ [V].

When the measurement is completed, in order to switch the voltage applied to the flight tube 5 from the positive polarity to the negative polarity, the control unit 20 turns off the positive-side main switching circuit 3 (all the positive-side main switching element 3a and the switching elements 3A connected in series) and the negative-side second auxiliary switch circuit 16 are turned off, and turns on the negative-side charge and discharge auxiliary switching element 18a while turning on the switching elements 4A connected in series. By doing this, the second capacitor 14 and the flight tube 5 are connected via the negative-side charge and discharge auxiliary switching element 18a and the switching elements 4A connected in series (that is, the negative-side first auxiliary switch circuit 18), and the current flows to the second capacitor 14 from the flight tube 5 due to the electric charges stored in the second capacitor 14 (as illustrated in FIG. 2E). The capacitance of the flight tube 5 is charged such that the voltage application end 5a has a positive polarity until just before being charged, but is rapidly charged to a negative polarity by the outflow of the current.

After the capacitance of the flight tube 5 is charged to a negative polarity by drawing the current using the second capacitor 14, the control unit 20 turns off the negative-side charge and discharge auxiliary switching element 18a while turning on the switching elements 4A connected in series, and turns on the negative-side main switching element 4a and the negative-side second auxiliary switch circuit 16. Accordingly, since the negative voltage generator 2 is connected to the flight tube 5, the stable negative DC voltage is applied to the flight tube 5 (as illustrated in FIG. 2F). Meanwhile, the charging voltage of the second capacitor 14 is lowered by the discharge of the second capacitor 14, but the second capacitor 14 and the auxiliary negative voltage generator 12 are connected again by turning on the negative-side second auxiliary switch circuit 16, and the second capacitor 14 is charged until the end-to-end voltage thereof becomes $-(H+\alpha)$ [V]. The measurement is performed in a state in which the stable DC voltage is applied from the negative voltage generator 2 to the flight tube 5 (as illustrated in FIG. 2A).

As described above, in the high-voltage power supply device of the first example embodiment, when the voltage applied to the flight tube 5 is switched from the positive polarity to the negative polarity or vice versa, the current is supplied to the flight tube 5 based on the electric charges stored in advance in the first capacitor 13 and the second capacitor 14 in the auxiliary power supply unit 10, and the capacitance of the flight tube 5 is charged to a value close to the DC high voltage of the polarity to be switched. The current supplied from the first capacitor 13 and the second capacitor 14 has no limitation unlike the current supplied from the voltage generators 1 and 2, and a large current determined depending on resistance values of internal resistors of the positive-side charge and discharge auxiliary switching element 17a, the negative-side charge and discharge auxiliary switching element 18a, and the switching elements 3A and 4A connected in series (alternatively, when a protective resistor is connected to the internal resistors in series, a series resistance value with the internal resistors) basically flows. Thus, the capacitance of the flight tube 5 is quickly charged, and a time (stabilization time) until the DC voltage becomes stable at the time of switching the polarity is also faster than when the auxiliary power supply unit 10 is not provided.

In the high-voltage power supply device of the first example embodiment, the plurality of switching elements 3A connected in series are shared by the positive-side main switch circuit 3 and the positive-side first auxiliary switch circuit 17 as described above. Thus, it is possible to reduce the total number of switching elements compared to a case where the positive-side main switch circuit 3 and the positive-side first auxiliary switch circuit 17 have the configuration in which the plurality (usually, a large number) of switching elements is independently connected in series. Accordingly, it is possible to reduce costs of the switching elements, and it is also possible to decrease an area of a circuit board on which the switching elements are mounted. As a result, there is an advantage in reducing the size and weight of the device.

Figure 3:
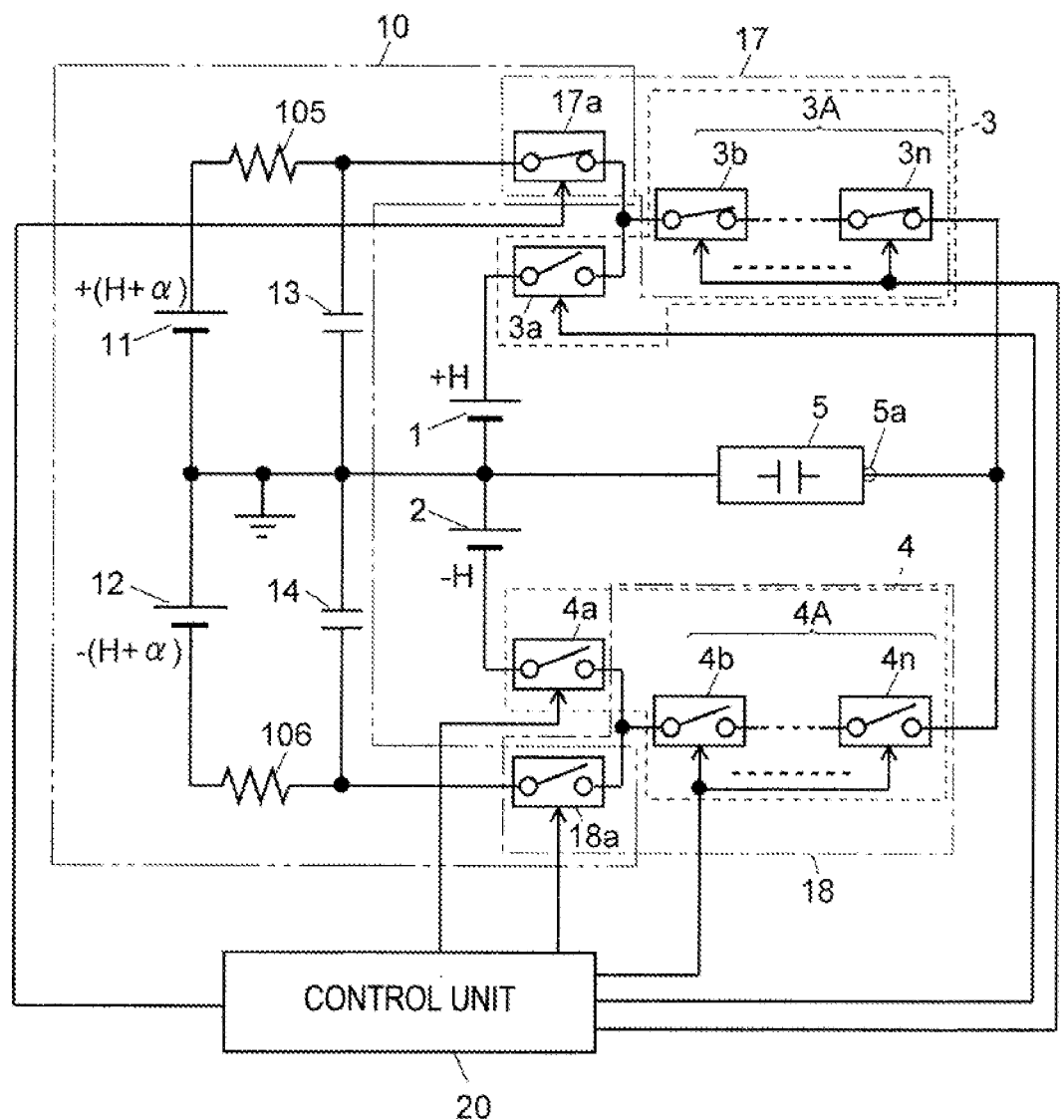
FIG. 3 is a schematic configuration diagram of a high-voltage power supply device according to a second example embodiment of the present invention.

A second example embodiment of the high-voltage power supply device according to the present invention will be described with reference to FIGS. 3 to 5. FIG. 3 is a schematic configuration diagram of the high-voltage power supply device according to the second example embodiment, FIGS. 4A to 4F show timing charts of control signals at the time of switching the polarity of the output voltage in the high-voltage power supply device of the second example embodiment, and FIGS. 5A to 5F are operation explanatory diagrams at the time of switching the polarity of the output voltage in the high-voltage power supply device of the second example embodiment.

In FIG. 3, the same or corresponding components as those of the high-voltage power supply device of the first example embodiment illustrated in FIG. 1 will be assigned the same reference signs. FIGS. 5A to 5F correspond to FIGS. 2A to 2F, respectively.

In the high-voltage power supply device of the second example embodiment, the two auxiliary switch circuits 15 and 16 in the high-voltage power supply device of the first example embodiment are replaced with resistors 105 and 106, respectively. The resistors 105 and 106 have a large resistance value of about several hundred kΩ to several MΩ. That is, in the high-voltage power supply device of the second example embodiment, the auxiliary positive voltage generator 11 and the first capacitor 13 are constantly connected through the resistor 105, and the auxiliary negative voltage generator 12 and the second capacitor 14 are constantly connected through the resistor 106.

Figure 5A:
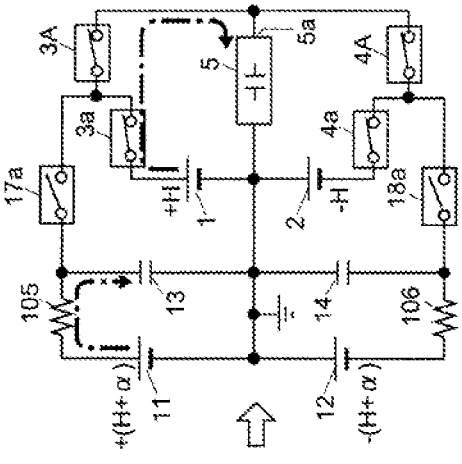
FIGS. 5A to 5F are operation explanatory diagrams at the time of switching the polarity of the output voltage in the high-voltage power supply device of the second example embodiment.

As illustrated in FIG. 5A, in a state in which the negative-side main switch circuit 4 (all the negative-side main switching element 4a and the switching elements 4A connected in series) is turned on, the positive-side main switching circuit 3 (all the positive-side main switching element 3a and the switching elements 3A connected in series) is turned off, and both the charge and discharge auxiliary switching elements 17a and 18a are turned off, when a potential at the voltage application end 5a of the flight tube 5 is stable at $-H$ [V], the end-to-end voltage of the first capacitor 13 connected to the auxiliary positive voltage generator 11 via the resistor 105 is charged to $+(H+\alpha)$ [V].

Figure 5B:
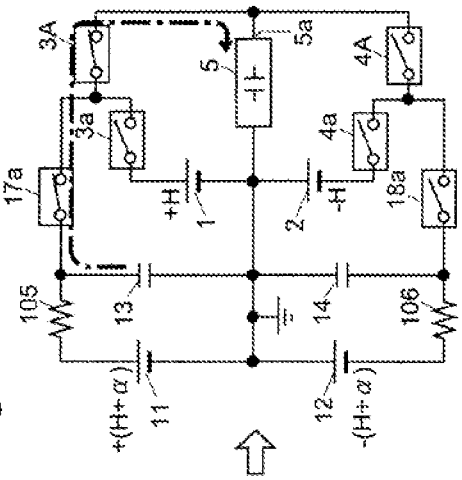

Thereafter, when the voltage applied to the flight tube 5 is switched from the negative polarity to the positive polarity, the control unit 20 turns off the negative-side main switching circuit 4 (all the negative-side main switching element 4a and the switching elements 4A connected in series). The control unit 20 applies a control signal illustrated in FIG. 4A to the positive-side charge and discharge auxiliary switching element 17a, and also applies a control signal illustrated in FIG. 4C to the switching elements 3A connected in series. Accordingly, the first capacitor 13 and the flight tube 5 are connected for a short time (1 ms in the present example) via the positive-side charge and discharge auxiliary switching element 17a and the switching elements 3A connected in series, and the current due to the electric charges stored in the first capacitor 13 flows to the flight tube 5 (as illustrated in FIG. 5B). The capacitance of the flight tube 5 is charged such that the voltage application end 5a has a negative polarity until just before being charged, but is rapidly charged to a positive polarity by the flow of the current.

When the positive-side charge and discharge auxiliary switching element 17a and the switching elements 3A connected in series are turned on, the auxiliary positive voltage generator 11 and the flight tube 5 are also connected via the resistor 105. However, since the resistance value of the resistor 105 is large, it is possible to suppress the current flowing from the auxiliary positive voltage generator 11 to the flight tube 5 to a level capable of being almost ignored by setting a time when the positive-side charge and discharge auxiliary switching element 17a is turned on to be sufficiently shorter than a time when the positive-side main switching circuit 3 (the positive-side main switching element 3a and the switching elements 3A connected in series) is turned on.

Figure 5C:
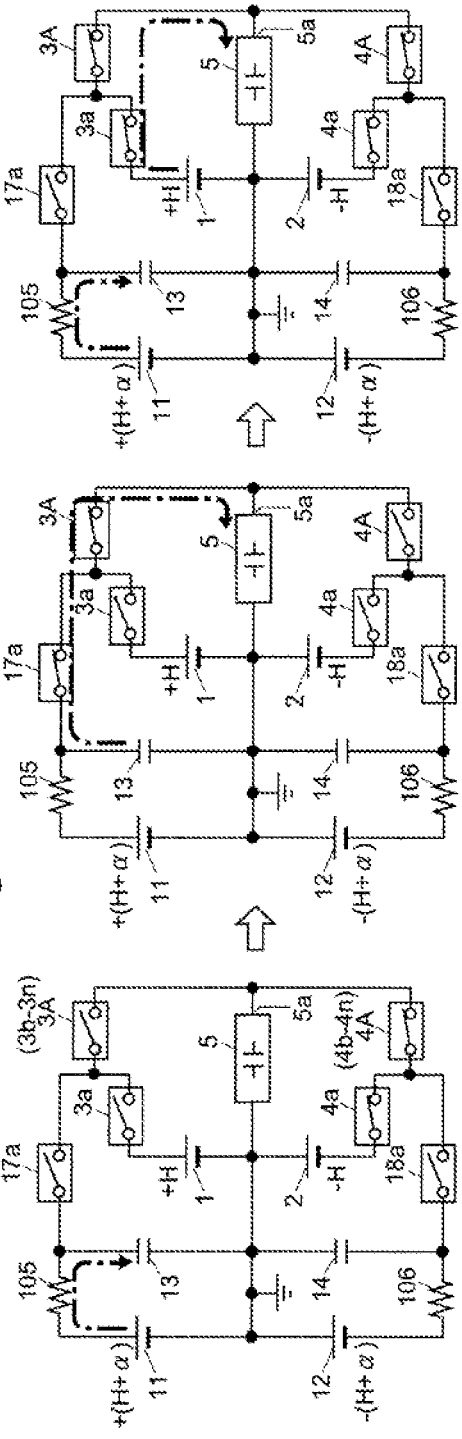

After the capacitance of the flight tube 5 is charged by the current supplied from the first capacitor 13, the control unit 20 turns off the positive-side charge and discharge auxiliary switching element 17a while turning on the switching elements 3A connected in series, and turns on by applying the control signal illustrated in FIG. 4B to the positive-side main switching element 3a. An on-time (time during which the control signal in FIG. 4B is at an "H" level) is 24 ms in the present example, and is sufficiently longer than an on-time of the positive-side charge and discharge auxiliary switching element 17a (a time when the control signal of FIG. 4A is an "H" level) as described above. Accordingly, since the positive voltage generator 1 is connected to the flight tube 5, the stable DC voltage having a voltage value of H [V] is applied to the flight tube 5 (as illustrated in FIG. 5C).

Figure 5D:
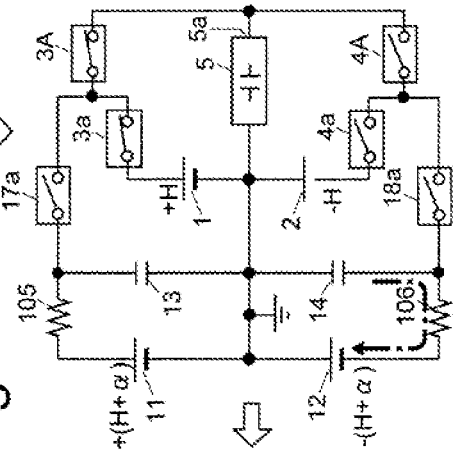

Meanwhile, although the charging voltage of the first capacitor 13 is lowered by the discharge of the first capacitor 13, since the first capacitor 13 and the auxiliary positive voltage generator 11 are connected via the resistor 105, the first capacitor 13 starts to be charged after being discharged. Thus, the first capacitor is charged until the end-to-end voltage thereof becomes +(H+α) [V]. The measurement is performed in a state in which the stable DC voltage is applied from the positive voltage generator 1 to the flight tube 5 (as illustrated in FIG. 5D). Meanwhile, in a state in which the negative-side charge and discharge auxiliary switching element 18a is turned off, the end-to-end voltage of the second capacitor 14 is charged to −(H+α) [V] by the auxiliary negative voltage generator 12.

Figure 5E:
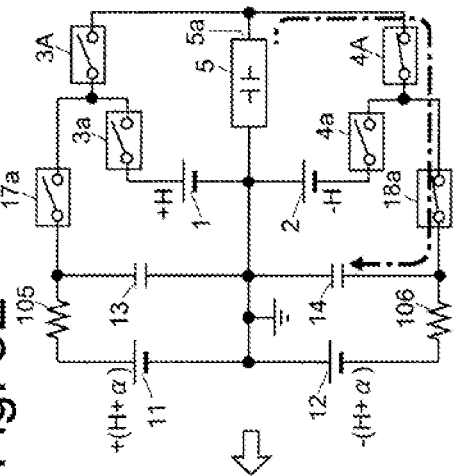

When the measurement is completed, in order to switch the voltage applied to the flight tube 5 from the positive polarity to the negative polarity, the control unit 20 turns off the positive-side main switching circuit 3 (all the positive-side main switching element 3a and the switching elements 3A connected in series), turns on the switching elements 4A by applying the control signal illustrated in FIG. 4F to the switching elements connected in series on the negative side, and turns on by applying the control signal illustrated in FIG. 4D to the negative-side charge and discharge auxiliary switching element 18a for a short time (in this example, 1 ms). By doing this, the second capacitor 14 and the flight tube 5 are connected via the negative-side charge and discharge auxiliary switching element 18a and the switching elements 4A connected in series, and the current flows to the second capacitor 14 from the flight tube 5 by the electric charges stored in the second capacitor 14 (as illustrated in FIG. 5E). The capacitance of the flight tube 5 is charged such that the voltage application end 5a has a positive polarity until just before being charged, but is rapidly charged to a negative polarity by the outflow of the current.

Figure 5F:
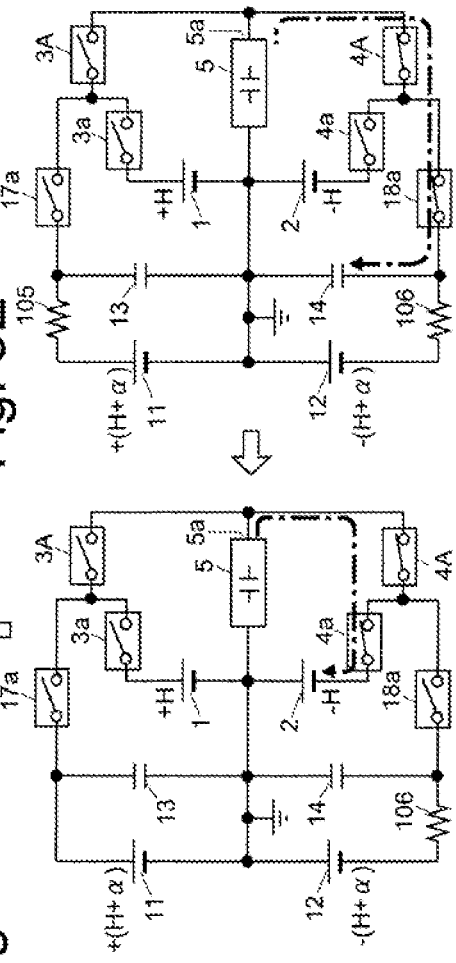
Figure 6A:
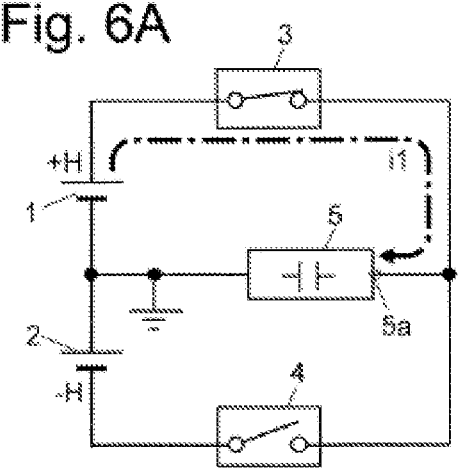
FIGS. 6A to 6D are explanatory diagrams of a schematic configuration and an operation of a high-voltage power supply device of the related art.
Figure 6B:
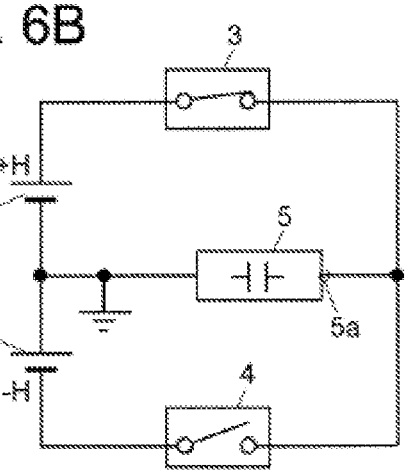
Figure 6D:
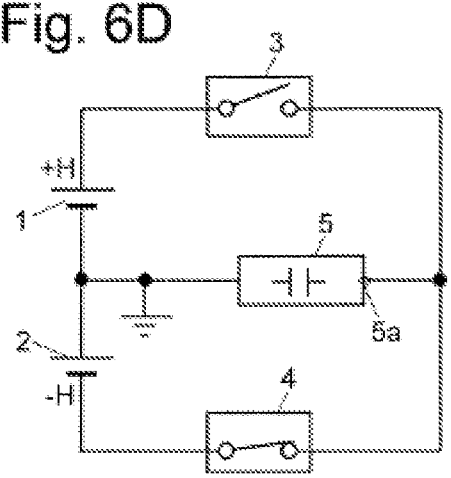
Figure 6C:
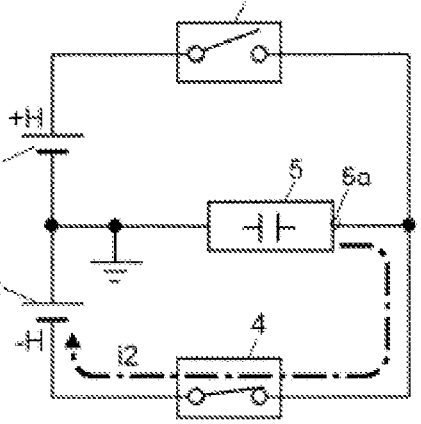

After the capacitance of the flight tube 5 is charged to the negative polarity by drawing the current using the second capacitor 14, the control unit 20 turns off the negative-side charge and discharge auxiliary switching element 18a, and turns on the negative-side main switching element 4a while turning on the switching elements 4A connected in series. Accordingly, since the negative voltage generator 2 is connected to the flight tube 5, the stable negative DC voltage is applied to the flight tube 5 (as illustrated in FIG. 5F). Meanwhile, the charging voltage of the second capacitor 14 is lowered by the discharge of the second capacitor. However, when the negative-side charge and discharge auxiliary switching element 18a is turned off, the second capacitor 14 is charged again until the end-to-end voltage thereof becomes −(H+α) [V]. The measurement is performed in a state in which the stable DC voltage is applied from the negative voltage generator 2 to the flight tube 5 (as illustrated in FIG. 5A).

As described above, in the high-voltage power supply device of the second example embodiment, the on-times of the charge and discharge auxiliary switching elements 17a and 18a are set to be sufficiently shorter than the on-times of the main switch circuits 3 and 4 (that is, the on-times of the main switching elements 3a and 4a), the substantially same operation as the operation in the first example embodiment is achieved.

Although it has been described that the auxiliary power supply unit 10 is used at the time of switching the polarity of the voltage applied to the flight tube 5, it is needless to say that it is also possible to accelerate a rise of the voltage by using the auxiliary power supply unit 10 when the positive or negative high voltage starts to be applied from a state in which the voltage is not applied.

The configuration of the high-voltage power supply device described above is merely an example of the present invention, and it is obvious that appropriate modifications, additions, and changes made within the gist of the present invention are included in the claims of the present application.

The high-voltage power supply device according to the present invention can be used not only for applying the high voltage to the flight tube of the TOFMS but also for various applications and devices in which it is necessary to switch a high voltage of about ±several [kV] at a high speed.

REFERENCE SIGNS LIST

1 . . . Positive Voltage Generator
2 . . . Negative Voltage Generator
3 . . . Positive-Side Main Switch Circuit
3a . . . Positive-Side Main Switching Element
3b to 3n . . . Switching Element
3A . . . Switching Elements Connected In Series
4 . . . Negative-Side Main Switch Circuit
4a . . . Negative-Side Main Switching Element
4b to 4n . . . Switching Element
4A . . . Switching Elements Connected In Series 5 ... Flight Tube
5a ... Voltage Application End
10 ... Auxiliary Power Supply Unit
11 ... Auxiliary Positive Voltage Generator
12 ... Auxiliary Negative Voltage Generator
13 ... First Capacitor
14 ... Second Capacitor
15 ... Positive-Side Second Auxiliary Switch Circuit
16 ... Negative-Side Second Auxiliary Switch Circuit
17 ... Positive-Side First Auxiliary Switch Circuit
17a ... Positive-Side Charge And Discharge Auxiliary Switching Element
18 ... Negative-Side First Auxiliary Switch Circuit
18a ... Negative-Side Charge And Discharge Auxiliary Switching Element
20 ... Control Unit
105, 106 ... Resistor

The invention claimed is:

1. A mass spectrometer with a flight tube forming a flight space in which ions fly and a high-voltage power supply device configured to apply a DC high voltage to the flight tube as a load to which a voltage is applied, the device comprising:
a main voltage generator configured to generate a predetermined DC high voltage;
a main switch unit configured to open and close a line which connects a voltage output end of the main voltage generator and the load to each other, and includes a plurality of switching elements connected in series;
an auxiliary power supply unit including an electric charge holding section and a charging section that charges the electric charge holding section, and configured to be capable of supplying a current larger than a current capable of being supplied by the main voltage generator to the load due to electric charges held in the electric charge holding section;
an auxiliary switch unit configured to open and close a line which connects a voltage output end of the auxiliary power supply unit and the load to each other, the auxiliary switch unit including a predetermined number of switching elements from a side of the load among the plurality of switching elements in the main switch unit, and another one or a plurality of switching elements connected in series between the predetermined number of switching elements and the voltage output end of the auxiliary power supply unit; and
a control unit configured to drive the switching elements of the main switch unit and the auxiliary switch unit such that a current is supplied to the load from the auxiliary power supply unit to charge a capacitance of the load by closing the auxiliary switch unit before the main switch unit is closed or immediately after the main switch unit is closed when the DC high voltage from the main voltage generator starts to be applied to the load by closing the main switch unit from an opened state.

2. The mass spectrometer according to claim 1, wherein the auxiliary power supply unit includes a capacitor as the electric charge holding section, and a charging power supply unit configured to charge the capacitor.

3. The mass spectrometer according to claim 2, wherein the auxiliary power supply unit further includes a second auxiliary switch unit configured to open and close a line which connects the charging power supply unit and the capacitor, and
the control unit closes the second auxiliary switch unit for a period during which the auxiliary switch unit is opened, and opens the second auxiliary switch unit when the auxiliary switch unit is closed.

4. The mass spectrometer according to claim 2, wherein the auxiliary power supply unit is provided at a line which connects the charging power supply unit and the capacitor to each other, and includes a resistor that restricts a current flowing through the auxiliary switch unit from the charging power supply unit when the auxiliary switch unit is closed.

5. The mass spectrometer according to claim 1, wherein the main voltage generator includes a positive-side main voltage generator configured to generate a positive DC high voltage, and a negative-side main voltage generator configured to generate a negative DC high voltage,
the main switch unit includes a positive-side main switch unit configured to open and close a line which connects a voltage output end of the positive-side main voltage generator and the load to each other, and a negative-side main switch unit configured to open and close a line which connects a voltage output end of the negative-side main voltage generator and the load to each other,
the auxiliary power supply unit includes a positive-side auxiliary power supply unit capable of supplying a current larger than a current capable of being supplied by the positive-side main voltage generator to the load, and a negative-side auxiliary power supply unit capable of supplying a current larger than a current capable of being supplied by the negative-side main voltage generator to the load, and
the control unit drives switching elements of the positive-side main switch unit, the negative-side main switch unit, the positive-side auxiliary switch unit, and the positive-side auxiliary switch unit such that a current is supplied to the load from the positive-side auxiliary power supply unit to charge the capacitance of the load by closing the positive-side auxiliary switch unit before the positive-side main switch unit is closed or immediately after the positive-side main switch unit is closed when the DC high voltage from the positive-side main voltage generator starts to be applied to the load by closing the positive-side main switch unit from an opened state, and a current is supplied to the load from the negative-side auxiliary power supply unit to charge the capacitance of the load by closing the negative-side auxiliary switch unit before the negative-side main switch unit is closed or immediately after the negative-side main switch unit is closed when the DC high voltage from the negative-side main voltage generator starts to be applied to the load by closing the negative-side main switch unit from an opened state.

6. The mass spectrometer according to claim 1, wherein the switching element is a power MOSFET.

7. The mass spectrometer according to claim 5, wherein the switching element is a power MOSFET.

* * * * *